P. G. MYERS.
DANGER SIGNAL.
APPLICATION FILED APR. 26, 1920.
1,386,893.
Patented Aug. 9, 1921.
2 SHEETS—SHEET 1.
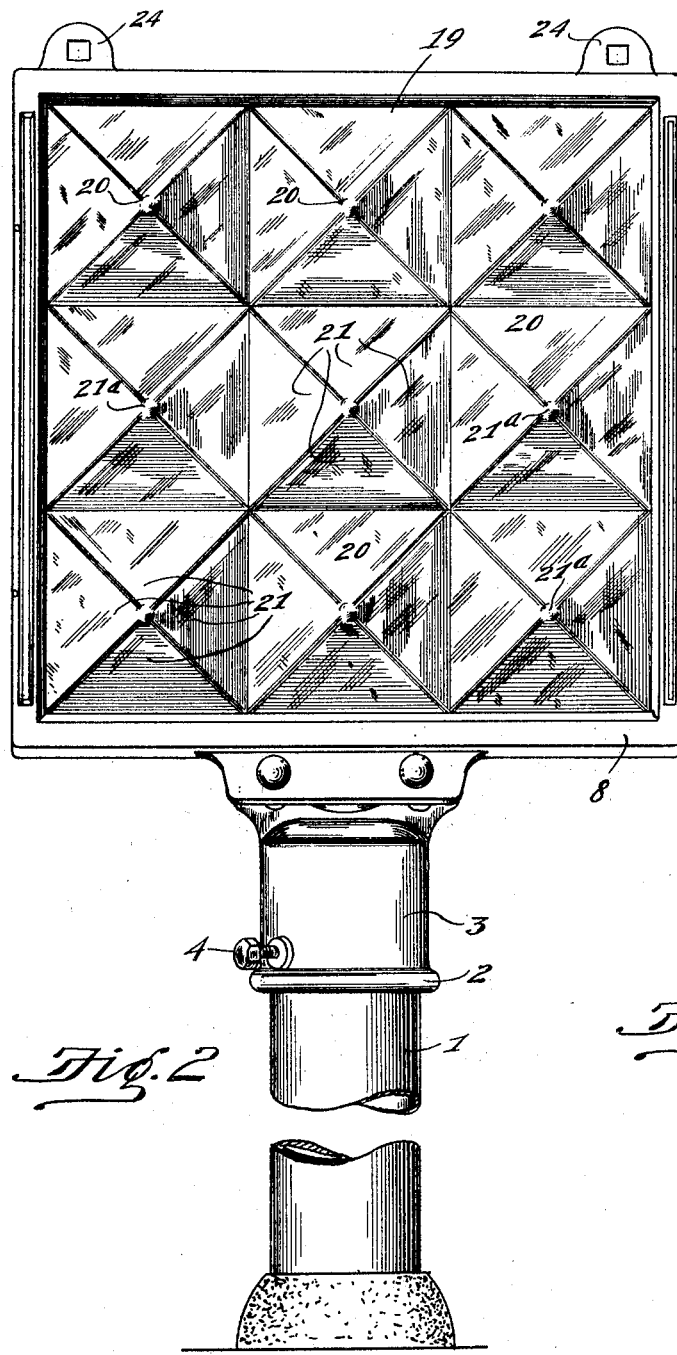
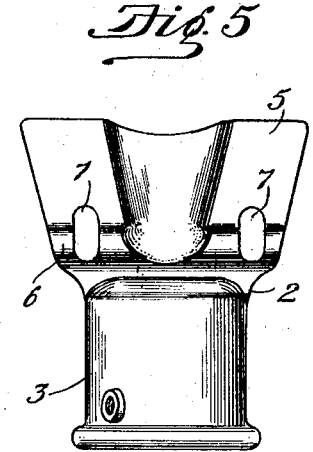
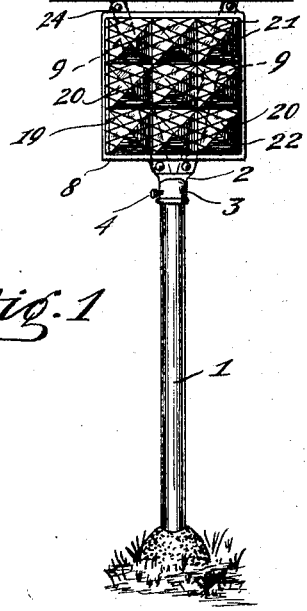
INVENTOR
P. G. Myers
BY: Freese, Merkel, Saywell and Bond
ATTORNEYS

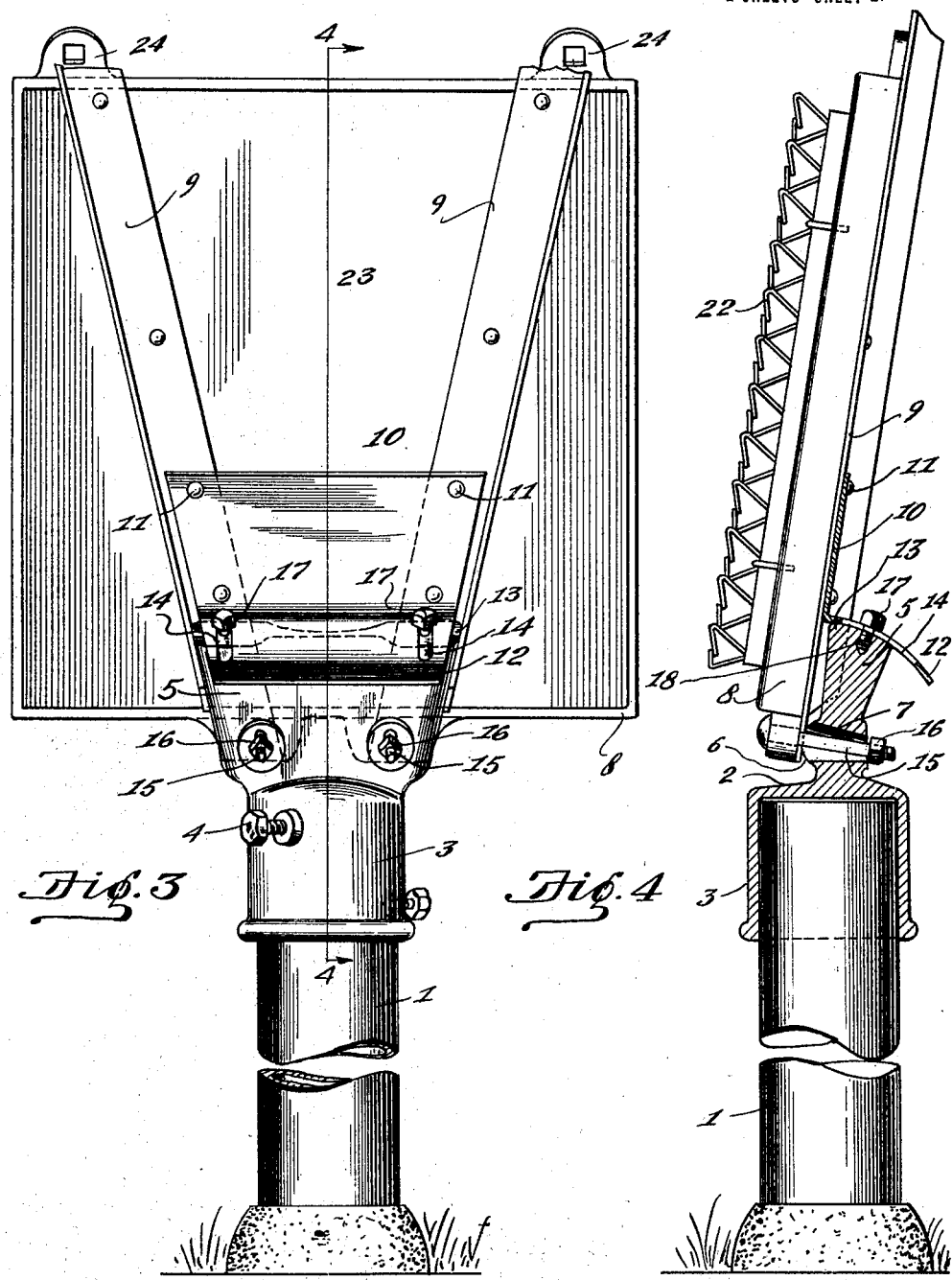

UNITED STATES PATENT OFFICE.

PARKE G. MYERS, OF CAIRO, OHIO, ASSIGNOR TO THE AUTOMATIC SIGNAL & SIGN COMPANY, OF CANTON, OHIO, A CORPORATION OF OHIO.

DANGER-SIGNAL.

1,386,893. Specification of Letters Patent. Patented Aug. 9, 1921.

Application filed April 26, 1920. Serial No. 376,673.

*To all whom it may concern:*

Be it known that I, PARKE G. MYERS, a citizen of the United States, residing at Cairo, in the county of Stark and State of Ohio, have invented a new and useful Danger-Signal, of which the following is a specification.

The present invention relates to signaling devices, such as are adapted to be located at dangerous points along a roadway or at intersections or cross roads or railroad crossings, and more especially to an adjustment for a signal device of this character by means of which the signal device may be located at any desired angle to catch the rays of light from an automobile headlight or from the headlight of a steam train or electric train or car and reflect said rays of light back to the operator of the vehicle or to the operator of an approaching vehicle coming from another direction.

The objects of the present invention are to provide a signaling device of the character referred to which will reflect the rays of light from a headlight of an approaching vehicle back to the operator of the vehicle or to the operator of another vehicle approaching from another direction and to provide an adjustment by means of which the signaling device may be set at any desired angle.

Another object of the invention is to provide a signaling device of the general character above mentioned which comprises a transparent colored medium including a plurality of angular surfaces provided with a mirror back and arranged to reflect rays of light in different directions.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

The invention thus set forth in general terms is illustrated in the accompanying drawings forming part hereof, in which—

Figure 1 is a front elevation of a signaling device embodying the invention.

Fig. 2 is a front elevation on an enlarged scale, portions being removed for purpose of illustration;

Fig. 3 is a rear elevation of the signaling device.

Figure 4 is a section on the line 4—4, Fig. 3.

Fig. 5 is a front elevation of the casting which supports the signaling device.

A practical embodiment of the invention is disclosed in the accompanying drawings, forming a part of this specification in which similar numerals of reference indicate corresponding parts throughout the several views.

The signaling device is mounted upon a post 1 which is embedded in the ground at any desired point along a roadway or at a cross road or railroad crossing. The casting 2 is provided with a collar 3 which receives the upper end of the post 1 and is held in any desired radial position thereon by means of the set screws 4.

The casting 2 is provided with an upwardly disposed rearwardly inclined web portion 5 which is flared outwardly toward the top. A horizontally half-round bead 6 is formed upon the forward face of the web 5 at the lower portion thereof and rearwardly tapered apertures 7 are formed through the web at this point.

The signal is carried in a rectangular metal frame 8 having the downwardly and inwardly inclined angle irons 9 connected to the rear side thereof, said angle irons being located at suitable angles to receive the web portion 5 as shown in Fig. 3. A plate 10 is located between the angle irons 9 near the lower ends thereof and connected thereto by means of rivets 11 or the like, said plate being provided upon its lower portion with a rearwardly curved portion 12 formed upon the same radius as the upper edge 13 of the web 5 and provided with elongated slots 14.

Bolts 15 carried by the lower portion of the frame 8 extend through the tapered apertures 7, nuts 16 being provided upon the rear ends of said bolts. Screws 17 are located through the elongated slots 14 and into screw threaded apertures 18 provided in the upper face of the web 5.

A reflector plate indicated generally by the numeral 19 is carried upon the forward side of the frame 8 this plate being made up of a plurality of rectangular sections indicated generally by the numeral 20, each section comprising a plurality of reflecting surfaces 21, set at angles to each other, a central convex portion 21ª adjoining all of said surfaces. This reflector plate is preferably formed of colored glass coated upon the rear surface with mercury or the like in the manner of an ordinary mirror.

A protecting screen 22 may be mounted over the face of the reflector plate, if desired, and a sheet metal plate 23 is preferably placed upon the rear side of the reflector plate 22 to prevent injury thereto. Lugs 24 are provided upon the upper edge of the frame 8 for the purpose of attaching a signal such as indicated at 25.

It will be seen that the frame 8 rests upon the rounded portion 6 of the casting and when it is desired to adjust the frame to any angle upon the casting the screws 15 are loosened and the frame rocked upon the rounded portion 6 to the desired angle after which the screws 15 are tightened holding the frame in the desired adjustment.

When it is desired to adjust the casting radially upon the post 1 the set screws 4 are loosened and the collar 3 is turned upon the post to the desired angle after which the set screws 4 are tightened.

It will be evident from the foregoing description and accompanying drawings that a signaling device is provided which may be easily and readily adjusted to any angle which may be required to reflect rays of light back to an approaching vehicle or at an angle to a vehicle approaching from another direction.

I claim:—

1. A signaling device comprising a post, a collar radially adjustable upon the upper end thereof, an upwardly extending web upon said collar provided with horizontally disposed apertures in its lower portion, a frame provided with rearwardly disposed bolts in its lower portion extending through the apertures in the web, nuts upon the rear ends of said bolts, a slotted rearwardly extending plate carried upon the rear side of said frame and a screw located through said slotted plate and into the upper end of the web.

2. A signaling device comprising a post, a collar radially adjustable upon the upper end thereof, an upwardly extending web upon said collar provided with horizontally disposed apertures in its lower portion, a frame provided with rearwardly disposed bolts in its lower portions extending through the apertures in the web, nuts upon the rear ends of said bolts, a slotted rearwardly extending curved plate carried upon the rear side of said frame and a screw located through said slotted plate and into the upper end of the web.

3. A signaling device comprising a post, a collar radially adjustable upon the upper end thereof, an upwardly extending web upon said collar, a horizontally disposed half-round bead upon the forward side of the web near the lower portion thereof, said web provided with horizontally disposed apertures extending through said bead, a frame provided with rearwardly disposed bolts in its lower portion extending through the apertures in the web, and bearing against said half-round bead, nuts upon the rear ends of said bolts, a slotted rearwardly extending plate carried upon the rear side of said frame and a screw located through said slotted plate and into the upper end of the web.

4. A signaling device comprising a post, a collar radially adjustable upon the upper end thereof, an upwardly extending web upon said collar provided with horizontally disposed rearwardly tapered apertures in its lower portion, a frame provided with rearwardly disposed bolts in its lower portion extending through the apertures in the web, nuts upon the rear ends of said bolts, a slotted rearwardly extending plate carried upon the rear side of said frame and a screw located through said slotted plate and into the upper end of the web.

5. A signaling device comprising a post, a collar radially adjustable upon the upper end thereof, an upwardly extending web upon said collar provided with horizontally disposed apertures in its lower portion, the upper end of said web being convex, a frame provided with rearwardly disposed bolts in its lower portions extending through the apertures in the web, nuts upon the rear ends of said bolts, a slotted rearwardly extending curved plate carried upon the rear side of the frame and extending over the convex upper edge of the web and a screw located through said slotted plate and into the upper end of the web.

6. A signaling device comprising a post, a collar radially adjustable upon the upper end thereof, an upwardly extending web upon said collar, a horizontally disposed half-round bead upon the forward side of the web near the lower portion thereof, said web provided with horizontally disposed apertures extending through said bead, the upper end of the web being convexed, a frame provided with rearwardly disposed bolts in its lower portion extending through the apertures in the web and bearing against said half-round bead, nuts upon the rear ends of said bolts, a slotted rearwardly extending plate carried upon the rear side of the frame and curved to fit the convexed top of the web and a screw located through said slotted plate and into the upper end of the web.

In testimony that I claim the above, I have hereunto subscribed my name.

PARKE G. MYERS.